(12) United States Patent
Licht

(10) Patent No.: US 10,936,854 B2
(45) Date of Patent: Mar. 2, 2021

(54) INDIVIDUAL BIOMETRIC-BASED TRACKING

(71) Applicant: NCR Corporation, Duluth, GA (US)

(72) Inventor: Yehoshua Zvi Licht, Alpharetta, GA (US)

(73) Assignee: NCR Corporation, Atlanta, GA (US)

(*) Notice: Subject to any disclaimer, the term of this patent is extended or adjusted under 35 U.S.C. 154(b) by 114 days.

(21) Appl. No.: 15/964,369

(22) Filed: Apr. 27, 2018

(65) Prior Publication Data
US 2019/0333123 A1 Oct. 31, 2019

(51) Int. Cl.
G06K 9/00 (2006.01)
G06Q 30/06 (2012.01)
G06K 9/66 (2006.01)

(52) U.S. Cl.
CPC ..... G06K 9/00268 (2013.01); G06K 9/00288 (2013.01); G06K 9/00771 (2013.01); G06Q 30/0601 (2013.01); *G06K 9/66* (2013.01)

(58) Field of Classification Search
CPC . G06Q 30/0601–0645; G06K 9/00268; G06K 9/00288; G06K 9/00771; G06K 9/66
See application file for complete search history.

(56) References Cited

U.S. PATENT DOCUMENTS

| | | | | |
|---|---|---|---|---|
| 2003/0018522 A1* | 1/2003 | Denimarck | ...... | G06Q 20/40145 705/14.23 |
| 2014/0153832 A1* | 6/2014 | Kwatra | ...... | G06T 11/00 382/195 |
| 2014/0363059 A1* | 12/2014 | Hurewitz | ...... | G06Q 30/0201 382/118 |
| 2015/0206081 A1* | 7/2015 | Lee | ...... | G06Q 30/02 705/7.13 |
| 2015/0269389 A1* | 9/2015 | Lee | ...... | G06F 21/6209 713/164 |
| 2019/0095601 A1* | 3/2019 | Chan | ...... | H04L 67/306 |
| 2019/0108551 A1* | 4/2019 | Chow | ...... | G06F 16/784 |

FOREIGN PATENT DOCUMENTS

WO WO-2016190814 A1 * 12/2016 ......... G06K 9/00295

OTHER PUBLICATIONS

"Nixon, Mark, 'On Soft Biometrics', Sep. 8, 2015, Pattern Recognition Letters, available at ScienceDirect, vol. 68, pp. 218-230" (Year: 2015).*
"Zervos, Michalis, 'Multi-Camera Face Detection and Recognition Applied to People Tracking', Jan. 2013, École Polytechnique, Master Thesis, pp. 1-67" (Year: 2013).*

* cited by examiner

*Primary Examiner* — William J Allen
*Assistant Examiner* — Maria S. P. Heath
(74) *Attorney, Agent, or Firm* — Schwegman, Lundberg & Woessner

(57) ABSTRACT

Real-time individual tracking at a site is provided by capturing an image at a specific location for the individual, extracting a limited number of biometric features from the image, and providing a searching mechanism for matching the scored biometric features to the individual at the specific location.

19 Claims, 4 Drawing Sheets

INDIVIDUAL BIOMETRIC-BASED TRACKING

BACKGROUND

The complexity and the investment of people tracking technologies at stores is very high. It is especially challenging when trying to keep track of objects surrounding a person and when there is a crowd of people.

In fact, most tracking technologies attempt to track an individual continuously at all locations within a site, which is challenging from a technology perspective because an individual may be constantly moving within the site, the background objects (scenery) may be constantly changing, and different areas of the site may include a large and densely populated set of other individuals (all of which may need to be tracked at the site). Furthermore, a large number of cameras have to be deployed at the site and oriented at proper angles so as to ensure that the individual is visible (within the field-of-view) in all areas of the site.

Cameras provide image data that is necessary for people tracking. Images include voluminous amount of data in a single image captured (especially when the pixel density of the cameras are high (better quality)). Passing large amounts of image data over a network can degrade the bandwidth and performance of the network making it more difficult to perform any timely people tracking.

Moreover and typically, people tracking technologies reprocess each image received from the dispersed cameras. Because of the data size of image files and the large number of images needed to track a single person, such technologies are processor intensive and are unable to provide any timely determinations.

As a result, people tracking technologies are presently impractical within the industry due to the costs associated with cameras that capture images and servers/networks that process/transmit large image files.

SUMMARY

In various embodiments, methods and a system for individual biometric-based tracking are presented.

According to an embodiment, a method for individual biometric-based tracking is provided. Specifically, in an embodiment, features are extracted from an image of an individual. The features are associated with a location. A specific customer is identified from the features and the features, the location, and the specific customer are reported.

DETAILED DESCRIPTION

Figure 1:
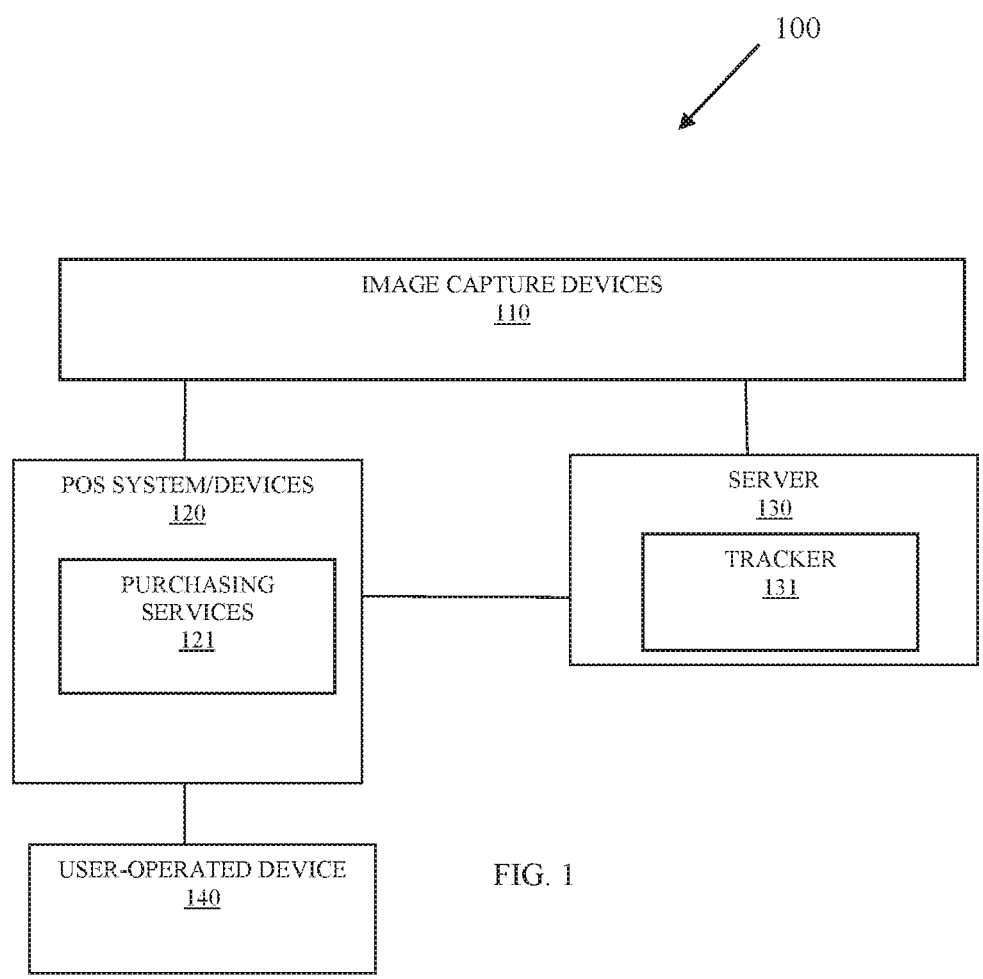
FIG. 1 is a diagram of a system for individual biometric-based tracking, according to an example embodiment.

FIG. 1 is a diagram of a system 100 for individual biometric-based tracking, according to an example embodiment. The system 100 is shown schematically in greatly simplified form, with only those components relevant to understanding of one or more embodiments (represented herein) being illustrated. The various components are illustrated and the arrangement of the components is presented for purposes of illustration only. It is to be noted that other arrangements with more or less components are possible without departing from the individual biometric-based tracking techniques presented herein and below.

Moreover, various components are illustrated as one or more software modules, which reside in non-transitory storage and/or hardware memory as executable instructions that when executed by one or more hardware processors perform the processing discussed herein and below.

The techniques, methods, and systems presented herein and below for individual biometric-based tracking can be implemented in all, or some combination of the components shown in different hardware computing devices having one or more hardware processors.

The system 100 includes a plurality of image capture devices 110, one or more Point-Of-Sale (POS) systems/devices 120 including one or more purchasing services 121, and a server including a biometric-based tracker 131 (hereinafter just "tracker 131"), Optionally, the system 100 also includes a user-operated device 140.

The image capture devices 110 are dispersed through a site of a retailer at various locations. At least some of the image capture devices 110 are integrated into or interfaced to POS devices 120 (can include Self-Service Terminals (SSTs) and cashier-assisted terminals).

The POS system/devices 120 can include transaction terminals (SSTs and cashier-assisted terminals) and one or more servers accessible to the transaction terminals. The purchasing services 121 can be processed on the transaction terminals and/or the servers. The purchasing services 121 can include loyalty-based services offered to customers, promotional-based services offered to customers, and automated transaction-based services.

The server 130 can be externally accessed server that is externally accessible to the purchasing services 121 over a Wide-Area Network (WAN) or the server 130 can be integrated into a same server that processes one or more of the purchasing services 121.

The tracker 131 is configured to process an image for sampling a set of biometric features of an individual captured in the image. A captured set of features is scored and linked to an identifier associated with the individual. As a new images are provided to the tracker 131, the same set of biometric features are sample from the new images and a new score is produced. The previous calculated score does not have to equal exactly the new calculated scores (although this can be the case in some situations). The new score is used as a search of previously calculated scores associated with a plurality of individuals being tracked. A match is obtained when the new score is within a predefined tolerance (range) of one of the previously calculated scores, or when the new score is closest to a particular one of the previously calculated scores, Once a match is found, the sampled set of biometric features associated with the new score and the new score are updated for the matched individual.

In an embodiment, the tracker 131 is configured to sample or extract a predefined number of features that may not be necessarily biometric features, such as head size, height, shirt color, shoes, etc.)

In an embodiment, the tracker 131 is configured to sample and/or extract a combination of biometric features and non-biometric features.

In an embodiment, the tracker 131 processes a machine-learning algorithm that updates and learns an optimal set of biometric features and scoring mechanism for those features, such that the accuracy of the tracker 131 increases with time with the updates to the scoring process and the biometric feature set that is sampled. The machine learning algorithm is initially trained on a plurality of individuals to identify the unique biometric feature set.

In an embodiment, the tracker 131 processes a Support Vector Machine (SVM) machine learning algorithm.

In an embodiment, the tracker 131 processes a K-Nearest Neighbor (KNN) machine learning algorithm.

It is important to note that the tracker 131 only samples specific areas in an image for some biometric features of an individual. This means that the entire image and all its pixels are not processed and this means that the responsiveness of the tracker 131 is substantially better than that of conventional people tracking technologies because the needed processing throughput is substantially faster when processing a small set of pixels in an image versus all pixels in an image.

In an embodiment, the tracker 131 samples 128 unique measurements for a face image identified in any given image.

When an individual needs to be tracked at a different location, the tracker 131 receives an image from one of the cameras 110 positioned at that location. The tracker 131 extracts the biometric feature set (as unique measurements) from the image. Then, the tracker 131 may score the feature set for purposes of finding a match to a specific individual (as discussed above) or the tracker 131 may use a machine-learning algorithm (SVM or KNN) to performing the scoring and matching (searching based on previous captured feature sets of individuals).

When a match is found, the customer identifier associated with the match (which was maintained when the customer was identified with a customer account in the previous-retained scored feature sets) is linked to the customer at the location (the location can be identified based on where the camera that supplied the image is known to be located).

So, the match can provide three to four pieces of information: the customer's identifier, location of the customer, customer's biometric feature set, and the customer's scored biometric feature set. The tracker 131 can provided this information in real time back to one or more of the purchasing services 121 for extending the feature function of those purchasing services 121.

Some example processing scenarios are now discussed for illustrating the features of the tracker 131 with the enhanced purchasing services 121.

A customer is identified at a check-in location within a store. This can occur in a variety of manners. For example, the customer may use device 140 (mobile phone, tablet, wearable processing device, etc.) and scan a check-in Quick Response (QR) code displayed on a display of a digital sign or printed on print media. This causes a store application processing on device 140 to access a store-based website and identify the device 140 as being registered to the customer. At the same time, a camera 110 captures an image of the customer (the camera 110 oriented to capture a facial image when the customer operates the device 140 to scan the OR code). The customer's identifier and the facial image sent from one of the purchasing services 121 to the tracker 131. The tracker 131 extracts the biometric feature set (as unique measurements), links the customer identifier to the feature set, scores or causes to be scored (through machine learning as discussed above) the feature set, and links a location associated with the camera 110 that provided the facial image.

In an embodiment, the feature set of the customer is updated to a customer database and is permanently linked to the customer identifier, such that on subsequent visits to the store the customer does not have to scan the OR code to be tracked at specific locations while in the store. In this embodiment, any newly captured biometric feature sets of the customer are updated to the customer database (either by the tracker 131 or through interaction between the tracker 131 and one of the purchasing services 121).

While the customer is within the store, at predetermined spots (locations) of significance to the store (such as shelves, checkout area, etc.), different cameras oriented and located at those spots take facial images of the customer and such images are obtained by the tracker 131. The biometric feature set is extracted for the face in the images and a match (through scoring and/or machine learning) is obtained, the matching record including a link to the customer database and/or the customer identifier (such that the purchasing services 121 can uniquely identify the customer. The locations are also noted based on the cameras 110 providing the images. A new location resulting from the new location of the customer is updated and the newly obtained biometric feature set obtained at each location is updated.

In another example, the check-in identification of the customer occurs in an automated fashion requiring no action of the customer. For example, the device 140 of the customer includes a store application that detects a beacon signal emitted from a beacon at the store, upon detection of the beacon signal, the store application sends a notice to a store check-in service with a mobile device identifier for the device 140, which the customer has previously registered and linked to the customer's account. A camera near the beacon obtains the facial image and provides to the tracker 131. Although, when the customer account already has the biometric feature set linked from previous visits of the customer, such initial facial image is unnecessary.

In an embodiment, the tracker 131 has access or can obtain access (through interaction with one of the purchasing services) to the customer database and customer accounts, such that updates to the location and feature set, and searching the feature sets can be done entirely by the tracker 131.

In an embodiment, a purchasing service 121 is enhanced to maintain a payment token for a customer with the customer account. In this way, a customer can be tracked when paying for services at one area of a store (such as gas pumps) then travel to a different area of the store (such as inside a grocery or convenience store) while being tracked and pay for any goods automatically with presentation of the payment token (obtained when the customer paid for fuel while at the gas pump). This permits Omni-channel tracking for the customer (outside the store and inside the store) with auto payment when payment was already consummated for one transaction made by the customer.

In an embodiment, the tracker 131 maintains a linked list for the customer that includes: the customer identifier or a link to the customer's account with the store, the customer's last updated biometric feature set, locations traveled within the store and/or outside the store (based on known locations of the cameras 110), and any payment token. When a customer leaves the store, the linked list can be updated to the customer database of the store (with all or some portions of the linked list).

In an embodiment, the tracker 131 also includes other features with the biometric features that are sample from the images, such as but not limited to: size and shape of the individual identified in the images, color of clothing worn by the individual, skin complexion of the individual. These other features may be used with the scoring mechanisms to improve the accuracy of identifying a specific individual that is at a store at a given date and time.

One now appreciates how more accurate and processor efficient people tracking can be processed by the tracker 131 through sampling of a limited number biometric features present in images of an individual's face. This makes people tracking capable of identifying a specific individual in a densely populated area where multiple people are present in a timely manner. Such processing allows for a variety of enhancements in existing store services, such as automated payment, automated customer assistance, automated theft detection, automated shopping, and the like.

These and other embodiments are no discussed with reference to the FIGS. 2-4.

Figure 2:
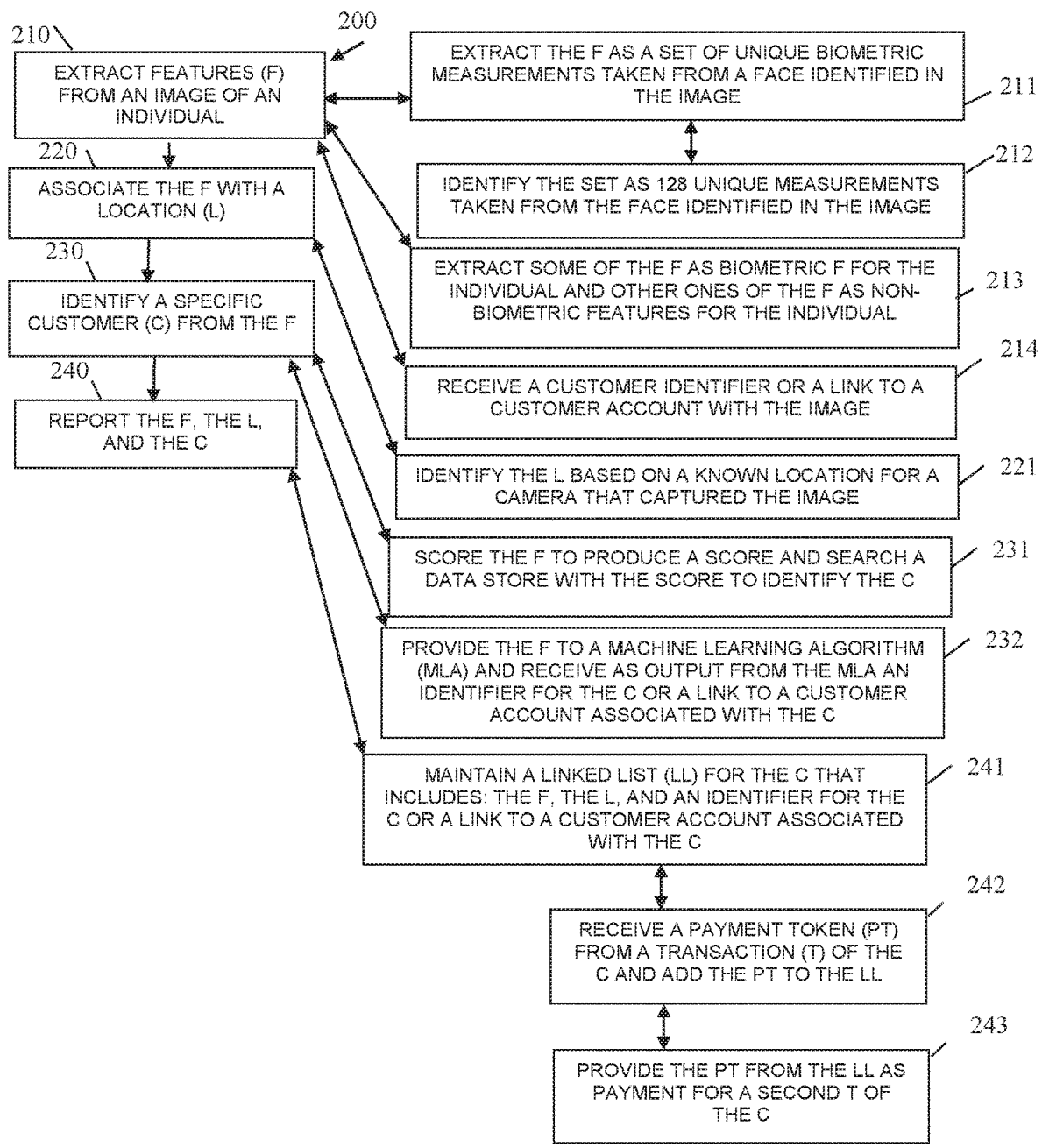
FIG. 2 is a diagram of a method for individual biometric-based tracking, according to an example embodiment.

FIG. 2 is a diagram of a method 200 for individual biometric-based tracking, according to an example embodiment. The software module(s) that implements the method 300 is referred to as a "person tracker." The person tracker is implemented as executable instructions programmed and residing within memory and/or a non-transitory computer-readable (processor-readable) storage medium and executed by one or more hardware processors of a hardware computing device. The processors of the device that executes the r person tracker are specifically configured and programmed to process the person tracker. The person tracker has access to one or more networks during its processing. The networks can be wired, wireless, or a combination of wired and wireless.

In an embodiment, the device that executes the person tracker is a server 110.

In an embodiment, the device that executes the person tracker is a collection of servers logically organized and operating as a cloud.

In an embodiment, the device that executes the person tracker is a server of a retailer associated with the retailer's POS system 120.

At 210, the person tracker extracts features from an image of an individual.

In an embodiment, at 211, the person tracker extracts the features as a set of unique biometric measurements taken from a face identified from the image.

In an embodiment of 211 and at 212, the person tracker identifies the set as 128 unique measurements taken from the face identified in the image.

In an embodiment, at 213, the person tracker extracts some of the features as biometric features for the individual and other ones of the features as non-biometric features for the individual. Here, non-biometric features may include clothing color, height of the individual, complexion of the individual, shape of the individual, and the like.

In an embodiment, at 214, the person tracker receives a customer identifier or a link to a customer account with the image. This can occur at an entry point of the store after a customer utilizes an automated mechanism to check-in or using previous registered features of the individual that are linked to an account of the individual already when the customer is first identified at the store.

At 220, the person tracker associates the features with a location within a store or a site (can be inside a store or outside the store (such as parking lot, etc.)).

In an embodiment, at 221, the person tracker identifies the location based on a known location for a camera that captured the image.

At 230, the person tracker identifies a specific customer from the features.

In an embodiment, at 231, the person tracker scores the features to produce a score, the score is then used for searching a data store with the score in order to identify the specific customer.

In an embodiment, at 232, the person tracker provides the features to a machine learning algorithm and receives as output from the machine learning algorithm an identifier for the specific customer or a link to a customer account associated with the specific customer.

At 240, the person tracker reports the features, the location, and the specific customer. This can be reported to any of the purchasing services 121 discussed above with the system 100.

In an embodiment, at 241, the person tracker maintains a linked list for the specific customer that includes: the features, the location, an identifier for the specific customer or a link to a customer account associated with the specific customer.

In an embodiment of 241 and at 242, the person tracker receives a payment token from a transaction of the specific customer and adds the payment token to the linked list.

In an embodiment of 242 and at 243, the person tracker provides the payment token from the linked list as payment for a second transaction of the specific customer.

Figure 3:
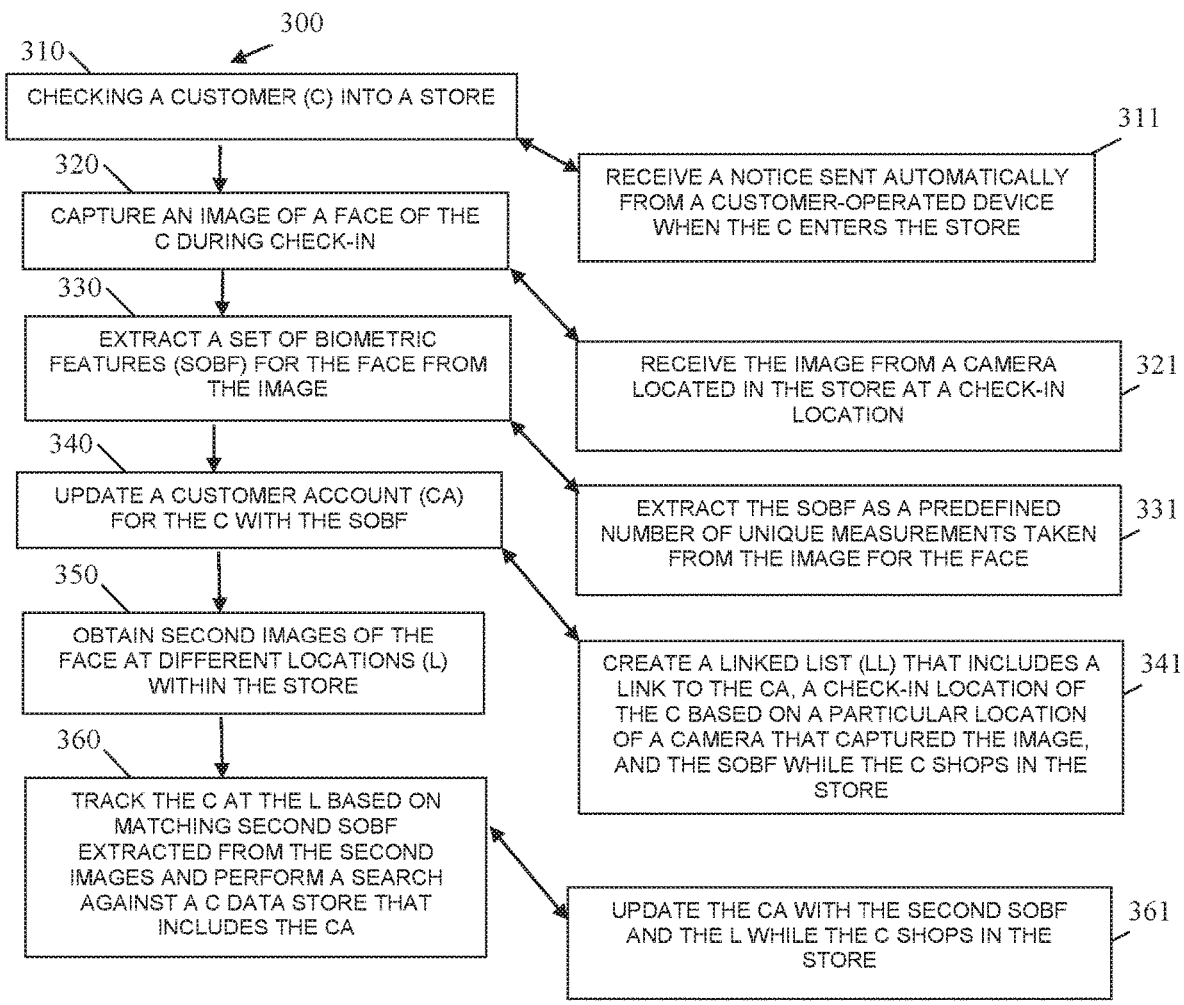
FIG. 3 is a diagram of another method for individual biometric-based tracking, according to an example embodiment.

FIG. 3 is a diagram of another method 300 for individual biometric-based tracking, according to an example embodiment. The software module(s) that implements the method 300 is referred to as a "tracker," The tracker is implemented as executable instructions programmed and residing within memory and/or a non-transitory computer-readable (processor-readable) storage medium and executed by one or more hardware processors of a hardware device. The processors of the device that executes the tracker are specifically configured and programmed to process the tracker. The tracker has access to one or more networks during its processing. The networks can be wired, wireless, or a combination of wired and wireless.

In an embodiment, the device that executes the tracker is the server 130.

In an embodiment, the device that executes the tracker is a collection of servers logically organized and processed as a cloud.

In an embodiment, the device that executes the tracker is a store server associated with that store's POS system 120.

In an embodiment, the tracker is the tracker 131.

In an embodiment, the tracker is the method 200.

In an embodiment, the tracker is a combination of the tracker 131 and the method 200.

The tracker presents another and enhanced processing perspective from that which was discussed above with the method 200.

At 310, the tracker checks a customer into a store. This can occur in a variety of automated manners some of which were discussed above with the system 100.

In an embodiment, at 311, the tracker receives a notice sent automatically from a customer-operated device (phone, tablet, wearable processing device, etc.) when the customer enters the store.

At 320, the tracker captures an image of a face of the customer during check-in.

In an embodiment, at 321, the tracker receives the image from a camera located in the store at a check-in location.

At 330, the tracker extracts a set of biometric features for the face from the image.

In an embodiment, at 331, the tracker extracts the set of biometric features as predefined number of unique measurements taken from the image for the face.

At 340, the tracker updates a customer account for the customer with the set of biometric features.

In an embodiment, at 341 the tracker creates a linked list that includes: a link to the customer account, a check-in location of customer based on a particular location of a camera that captured the image, and the set of biometric features while the customer is shopping in the store.

At 350, the tracker obtains second images of the face at different locations within the store.

At 360, the tracker tracks the customer at the different locations based on matching the second set of biometric features extracted from the second image and performing a search against a customer data store that includes the customer account.

In an embodiment, at 361 the tracker updates the customer account with the second set of biometric features and the different locations while the customer shops in the store.

Figure 4:
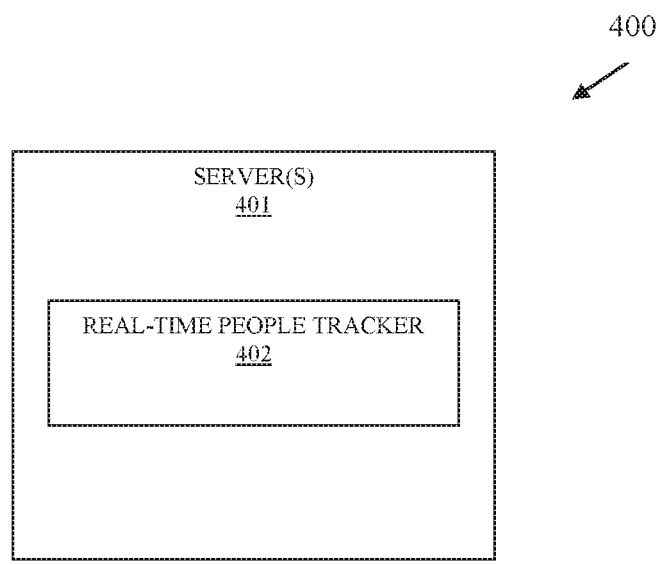
FIG. 4 is a diagram of another system for individual biometric-based tracking, according to an example embodiment.

FIG. 4 is a diagram of a system 400 for individual biometric-based tracking, according to an example embodiment. The system 400 includes a variety of hardware components and software components. The software components of the system 400 are programmed and reside within memory and/or a non-transitory computer-readable medium and execute on one or more hardware processors of a hardware device. The system 400 communicates one or more networks, which can be wired, wireless, or a combination of wired and wireless.

In an embodiment, the system 400 implements all, any, or some combination of the processing discussed above with the FIGS. 1-3.

The system 400 includes one or more servers 401 and a real-time people tracker 402. The server(s) 401 include at least one hardware processor.

In an embodiment, the server 401 is the server 130.

In an embodiment, the server 401 is a collection of servers logically organized and processed as a cloud.

In an embodiment, the server 401 is a server associated with a store and the store's POS system 120.

In an embodiment, the real-time people tracker 402 is the tracker 131.

In an embodiment, the real-time people tracker 402 is the method 200.

In an embodiment, the real-time people tracker 402 is the method 300.

In an embodiment, the real-time people tracker 402 is all or some combination of: the tracker 131 the method 200, and/or the method 300.

The real-time people tracker 402 is configured to: (i) execute on the hardware processor of the server 401, (ii) extract biometric features from images taken of customers while in a store, (iii) link the biometric features to accounts of the customers, and (iv) track each of the customers and locations of the customers while in the store based on the biometric features.

The real-time people tracker 402 is further configured to: (v) link payment tokens to the customer accounts for automated payment by the customers at the locations within the store.

The real-time people tracker 402 is further configured to: (v) process a machine-learning algorithm to match specific biometric features to specific customers.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:

extracting, by executable instructions that are executed on a hardware processor from a non-transitory computer-readable storage of a server, features from an image of an individual that is taken by a first camera, wherein extracting further includes sampling specific areas of the image and obtaining the features from the specific areas, wherein extracting further includes extracting some of the features as biometric features for the individual and other ones of the features as non-biometric features for the individual;

associating, by the executable instructions, the biometric features and the non-biometric features with a location within a store where the image was captured by the first camera;

identifying, by the executable instructions, a specific customer from the biometric features;

linking, by the executable instructions, the specific customer to a customer account with the store;

generating, by the executable instructions, a score for the specific customer based on the biometric features and the non-biometric features;

reporting, by the executable instructions, the biometric features, the non-biometric features, the location, the specific customer, and the customer account to store services being processed within the store; and tracking the specific customer within the store by iterating back to the extracting for each additional image captured for the individual by at least one second camera at one or more different locations within the store based on the score and using the non-biometric features on each iteration to improve an accuracy in tracking the specific customer when the specific customer is at the one or more different locations within the store on a given date and time.

2. The method of claim 1, wherein extracting further includes extracting the biometric features as a set of unique biometric measurements taken from a face identified in the image.

3. The method of claim 2, wherein extracting further includes identifying the set as 128 unique biometric measurements taken from the face identified in the image.

4. The method of claim 1, wherein extracting further includes receiving a customer identifier or a link to a customer account with the image.

5. The method of claim 1, wherein associating further includes identifying the location based on a known location for the first camera that captured the image.

6. The method of claim 1, wherein generating further includes searching a data store with the score to identify the specific customer.

7. The method of claim 1, wherein identifying further includes providing the biometric features to a machine learning algorithm and receiving as output from the machine learning algorithm an identifier for the specific customer or a link to a customer account associated with the specific customer.

8. The method of claim 1, wherein reporting further includes maintaining a linked list for the specific customer that includes: the biometric features, the non-biometric features, the location, the one or more different locations, and an identifier for the specific customer or a link to a customer account associated with the specific customer.

9. The method of claim 8, receiving a payment token from a transaction of the specific customer and adding the payment token to the linked list.

10. The method of claim 9 further comprising, providing, by the executable instructions, the payment token from the linked list as payment for a second transaction of the specific customer.

11. The method of claim 1 further comprising, updating, by the executable instructions, a customer account associated with the specific customer with the biometric features and the location.

12. A method, comprising:
checking a customer into a store;
capturing an image of a face of the customer during a check-in, wherein capturing further includes capturing the image by a first camera of the store;
identifying a customer account of the customer with the store during the check-in;
extracting a set of biometric features for the face from the image, wherein extracting further includes sampling specific areas of the image and obtaining the set of biometric features from the specific areas, wherein extracting further includes sampling other areas of the image and obtaining non-biometric features for the customer;
updating the customer account for the customer with the set of biometric features;
generating a score for the specific customer based on the set of biometric features and the non-biometric features;
obtaining second images of the face at different locations within the store, wherein obtaining further includes obtaining the second images from second cameras of the store situated at the different locations; and
tracking the customer at those different locations based on matching second sets of biometric features extracted from the second images based on sampling the specific areas of the second images, obtaining the second sets of biometric features from the specific areas of the second images, updating the score based on each second set of biometric features while using the non-biometric features to improve an accuracy in tracking the customer when the customer is at the different locations within the store on a given date and time, and performing a search against a customer data store to link the customer to the customer account.

13. The method of claim 12, wherein checking further includes receiving a notice sent automatically from a customer-operated device when the customer enters the store.

14. The method of claim 12, wherein capturing further includes receiving the image from a camera located in the store at a check-in location.

15. The method of claim 12, wherein extracting further includes extracting the set of biometric features as a predefined number of unique measurements taken from the image for the face.

16. The method of claim 12, wherein updating further includes creating a linked list that includes: a link to the customer account, a check-in location of the customer based on a particular location of a camera that captured the image, the non-biometric features, and the set of biometric features while the customer shops in the store.

17. The method of claim 12, wherein tracking further includes updating the customer account with the second set of biometric features and the different locations while the customer shops in the store.

18. A system, comprising:
cameras situated at various locations within a store;
a server comprising: at least one hardware processor and a non-transitory computer-readable storage medium comprising executable instructions representing a real-time order people tracker;
the real-time order people tracker is executed by the at least one hardware processor and causes the at least one hardware processor to perform processing comprising:
extracting biometric features and non-biometric features from images taken of customers by the cameras at the various locations while the customers are within the store by sampling specific areas of the images and obtaining the biometric features from the specific areas of the images and by sampling other areas of the images and obtaining the non-biometric features from the other areas;
linking the biometric features to accounts of the customers;
generating scores for the customers based on the biometric features and the non-biometric features;
tracking each of the customers and locations of the customers while in the store based on the biometric features and the scores while using the non-biometric features to improve an accuracy in tracking the customers when the customers are at the locations within the store on given dates and times; and
providing the accounts and the locations to store services being processed within the store.

19. The system of claim 18, wherein the real-time people tracker is executed by the at least one hardware processor and further causes the at least one hardware processor to perform additional processing comprising: linking payment tokens to the customer accounts for automated payment by the customers at the locations within the store.

* * * * *